Dec. 23, 1952

A. H. DICKINSON

TRIGGER CIRCUIT CHAIN

Filed Aug. 3, 1950

2,623,170

INVENTOR
ARTHUR H. DICKINSON
BY John R. Shipman
ATTORNEY

Patented Dec. 23, 1952 2,623,170

UNITED STATES PATENT OFFICE 2,623,170

TRIGGER CIRCUIT CHAIN

Arthur H. Dickinson, Greenwich, Conn., assignor to International Business Machines Corporation, New York, N. Y., a corporation of New York Application August 3, 1950, Serial No. 177,445

10 Claims. (Cl. 250—27)

This invention relates to a chain of electronic trigger circuits and particularly to a chain of trigger circuits of the type incorporating a semiconductor translating device.

In my copending application Serial No. 177,446 filed concurrently herewith there is described an electronic trigger circuit incorporating a translating device, the characteristics of which are such that it provides an output current variable with variations in input voltage applied to the translating device. Specifically, there is described a trigger circuit incorporating a semiconductor translating device comprising a semiconductor having emitter, collector and base connections. In such a semiconductor translating device current may flow with a low impedance through the emitter into the semiconductor but the output current from the semiconductor through the collector normally encounters a relatively high impedance. This impedance is provided by an electrical barrier through which it it difficult for current-carriers of the sign of the carriers normally present in the semiconductor to pass toward the collector. Such a barrier may be formed by employing a point contact, rectifying collector connection through the semiconductor or in various other suitable ways. Current flow into the semiconductor through the emitter introduces into the semiconductor current-carriers of a sign opposite to that of the carriers normally present therein. The current-carriers so introduced are effective to reduce the impedance to current flowing out through the collector. The greater the number of carriers of opposite sign introduced, the lower the impedance becomes and consequently the collector current varies with the emitter current. The base connection provides a low impedance path for current therethrough into or out of the semiconductors. A suitable well-known semiconductor translating device of this type is the semiconductor triode called a "transistor," described in articles by Bardeen and Brattain in The Physical Review 75, 1208–April 1949 and by Becker and Shive in Electrical Engineering 68, 215–March 1949.

In the trigger circuit of the aforementioned copending application, a direct current voltage supply is provided and the trigger circuit may be formed by connecting the emitter to a positive terminal of the voltage supply, the collector to a negative terminal of the voltage supply through a load resistor and the base to an intermediate terminal through a vacuum tube. The vacuum tube is arranged to control the flow of current from the base and thereby to control the flow of emitter current. Because of the characteristics of the semiconductor translating device, variations in emitter current produce corresponding variations in collector current and thereby produce variations in the I. R. voltage drop in the load resistor. The control grid of the vacuum tube is connected to the load resistor in a feedback arrangement in such manner that when the collector current is at a minimum, the vacuum tube is just below cutoff. The trigger circuit then has two alternate stable states, in the first of which the current through the emitter and vacuum tube and collector is at a minimum and in the second of which it is at a maximum.

Switching of the trigger circuit of my copending application from the first to the second stable state may be accomplished by application of an appropriate input impulse to the base of the semiconductor translating device. Switching from the second to the first stable state may be accomplished by applying an appropriate input impulse to the control grid of the vacuum tube. Scaling of the trigger circuit, that is, switching of the trigger circuit from one state to the other with each of a series of input impulses applied concurrently to the base of the semiconductor translating device and the grid of the tube, may be accomplished by providing suitable time delay arrangements as described in the copending application, such as a condenser between the collector of the translating device and the grid of the vacuum tube or a condenser between the cathode of the vacuum tube and the voltage supply, which latter condenser is shunted by a discharging resistor.

In numerous prior art arrangements a chain of electronic trigger circuits has been provided with a trigger circuit being switched by an input pulse provided from the output of the preceding trigger circuit in the chain, the trigger circuits being of the familiar Eccles-Jordan type incorporating a pair of cross-coupled vacuum tubes. Such chains of trigger circuits are employed as commutators and counters. When the trigger circuits of my copending application were first devised, an attempt was made to connect them into a chain. The obvious way of connecting such trigger circuits into a chain in accordance with the teaching of the prior art chains, was to feed the voltage pulses developed across the load resistor of the collector circuit to the input of the next succeeding trigger circuit in the chain. However, the attempt to do so was unsuccessful as, under such conditions, the first trigger circuit not only failed to operate the second but failed itself to operate as a trigger circuit.

It is an object of the present invention to provide a novel chain of electronic trigger circuits of the type described in my aforesaid copending application in which a trigger circuit is switched by a voltage pulse provided from the output of the preceding trigger circuit.

Another object of my invention is to provide a new and improved trigger circuit chain, each trigger circuit being of the type described in my aforesaid copending application in which a trigger circuit in the chain is switched from one stable state to the other by an input impulse provided from an outside source and is switched from the other state to the first stable state by an output pulse provided from the output of the preceding trigger circuit in the chain.

A still further object of my invention is to provide a new and improved chain of scaling trigger circuits of the type described in the aforesaid copending application, in which input pulses to a trigger circuit are provided from the output of the preceding trigger circuit in the chain.

In accordance with my invention I have discovered that the failure of the described attempt to form a chain was apparently caused by a mismatch between the output impedance of the first trigger circuit and the input impedance of the second trigger circuit. Upon interconnecting the two trigger circuits together the impedance of the input circuit of the second trigger circuit became tied into the output circuit of the first trigger circuit and completely disrupted the impedance relationships in that first trigger circuit which were necessary to effect a triggering action.

I have further discovered that in a trigger circuit of the type described, a resistor of substantial magnitude may be inserted between the cathode of the vacuum tube and the voltage supply without disrupting the triggering action of the circuit. I have also discovered in accordance with my invention that the voltage pulses produced across such resistor may be fed to the input of another trigger circuit to operate that circuit without disrupting the operation of the first trigger circuit.

Other objects and advantages of the invention will be pointed out in the following description and claims and illustrated in the accompanying drawings, which disclose, by way of example, the principle of the invention and the best mode, which has been contemplated, of applying that principle.

Figure 1:
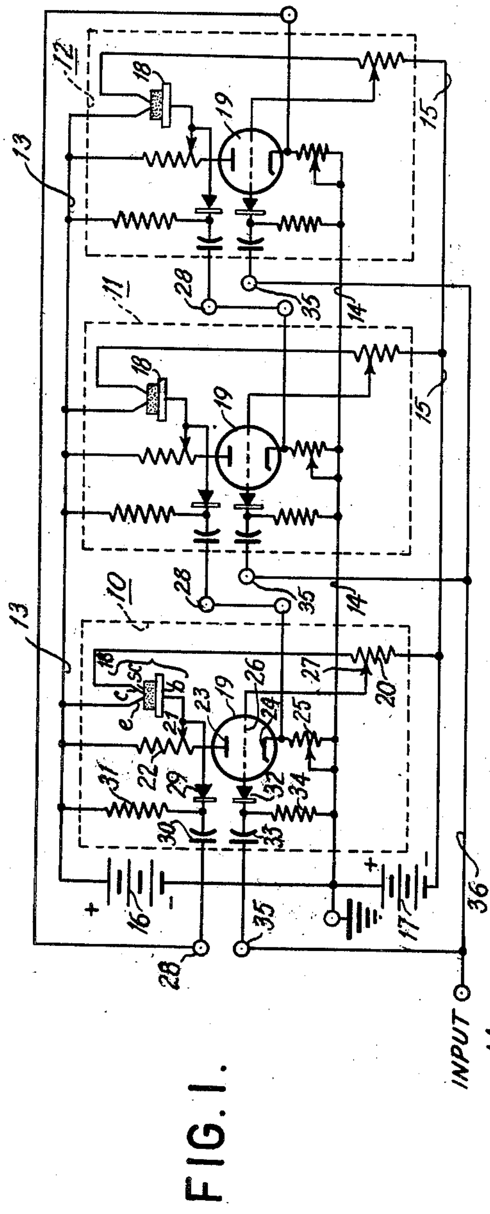
Fig. 1 is a circuit diagram of a chain of trigger circuits in accordance with my invention in which a trigger circuit is arranged to be switched from one state to another by an input impulse from an outside source and thereafter switched back from that other state by an input impulse provided from the output of a preceding trigger circuit in the chain.

In Fig. 1 there is shown a plurality of trigger circuits 10, 11 and 12 connected in an endless chain or ring, such as might be employed in a commutator. Three voltage supply lines 13, 14 and 15 are provided at positive, ground and negative voltage levels, respectively, through connections to a direct current voltage supply such as the batteries 16 and 17. Each of the three trigger circuits individually correspond to a trigger circuit described in my copending application and include a semiconductor translating device 18 and a vacuum tube 19.

The semiconductor translating device 18 includes a suitable semiconductor *sc*, such as *n*-type germanium, on the surface of which are two suitably arranged point-contact, rectifying, electrodes forming an emitter *e* and a collector *c*, and a large area ohmic contact electrode forming the base *b*. The emitter *e* is connected to the positive voltage supply line 13. The collector *c* is connected through a load resistor 20 to the negative voltage supply line 15. The base *b* is connected to an intermediate tap 21 on the resistor 22 which, in turn, is connected between the positive supply line 13 and the anode 23 of tube 19. The resistor 22 is provided to permit easy adjustment of the voltage level between the emitter *e* and the base *b* of the translating device 18 but as explained in my copending application may be omitted if desired.

The cathode 24 of the tube 19 is connected through a resistor 25 to the grounded line 14. The control grid 26 of the tube 19 is connected to an intermediate tap 27 on the load resistor 20.

The base *b* of the translating device 18 in each of the trigger circuits 10, 11 and 12 is connected to an input terminal 28 through a diode rectifier 29 and a suitable differentiating circuit comprising a capacitor 30 and a resistor 31. Similarly, the grid 26 of the tube 19 is coupled through a rectifier 32 and a differentiating circuit comprising capacitor 33 and resistor 34 to another input terminal 35.

The input terminals 35 of all of the trigger circuits 10, 11 and 12 are connected directly to an input supply line 36 which is adapted to receive suitable negative, or falling front, voltage input impulses from an outside source not shown. The input terminal 28 of each of the three trigger circuits 10, 11 and 12 is connected to the cathode 24 of the tube 19 in the preceding trigger circuit in the chain. Thus terminal 28 of trigger circuit 11 is connected to the cathode of tube 19 in trigger circuit 10; terminal 28 of trigger circuit 12 is connected to the cathode of tube 19 in trigger circuit 11; and terminal 28 of trigger circuit 10 is connected to the cathode of tube 19 in trigger circuit 12.

Before describing the operation of the chain of trigger circuits in Fig. 1 the operation of the individual trigger circuits should be considered. Let it be assumed tube 19 in trigger circuit 10 is initially substantially nonconductive. A small current is then flowing from the positive supply line 13 through the emitter *e*, the semiconductor *sc*, and the collector *c* of the translating device 18, and the load resistor 20 to the negative supply line 15. The tap 27 on the resistor 20 is adjusted so that with this small current through the resistor 20 the grid 26 is sufficiently negative relative to the cathode 24 to keep the tube 19 substantially non-conductive. The circuit from the base *b* to the grounded line 14 is then maintained open by the non-conductive tube 19. This is the first stable state of the trigger circuit, the grid 26 being sufficiently negative that small variations in the collector current do not have any substantial effect on the conductivity of the tube.

With the trigger circuit 10 of Fig. 1 in its first stable state, let it be assumed that a negative voltage impulse is applied through terminal 28 to the base $b$ of the translating device 18. When the base $b$ thus becomes more negative, another path for current leaving the semiconductor $sc$ is established. Current entering the semiconductor $sc$ through emitter $e$ then flows out through collector $c$ and the resistor 20 in one path and also flows out along a parallel path through base $b$ and terminal 28. With this parallel path arrangement the total emitter current increases substantially. The increase in emitter current, because of the characteristics of the translating device, causes an increase in the collector current. This, in turn, increases the I. R. voltage drop across the load resistor 20 making the adjustable tap 27 and the grid 26 of tube 19 less negative relative to the cathode 24. As the grid 26 becomes less negative the tube 19 becomes conductive and the current flows from the base $b$ through the tube 19 and resistor 25 to the grounded line 14 causing the emitter current to increase still further even though the input impulse may be decreasing or ending. This further increase in the emitter current causes another increase in the collector current which results in the grid 26 becoming even less negative and somewhat positive.

Thus, a regenerative effect occurs in which an increase in emitter current causes an increase in the collector current resulting in a further increase in the emitter current until the trigger circuit reaches a second stable state. A second stable state is attained when the voltage relationship between the grid and cathode of the tube 19 reaches the point at which, because of the well-known tube characteristics, further increases in the grid voltage do not increase the tube current sufficiently to cause a substantial increase in collector current.

Of course, with input impulses of different magnitudes and waveforms, and with different voltages and resistances in the circuit, the time of a switching operation and the amount of regeneration may be different. With an impulse of high magnitude and relatively long duration, the tube 19 may be fully conductive by the time the input impulse ends. On the other hand, with an impulse of lesser magnitude and duration, the tube 19 may not be fully conductive by the time the input impulse ends but the regenerative operation continues until the switching is complete. It is necessary, of course, that the impulse be of sufficient magnitude and duration to place the regenerative effect of the circuit in operation.

With the trigger circuit 10 of Fig. 1 in its second stable state, wherein substantial current flows through the collector $c$ of the translating device 18 and through the tube 19, the circuit may be switched back to its first stable state by applying a negative, or falling front, voltage impulse to the grid 26 of tube 19. This impulse must be of such size and duration as to cause the current flow through the tube 19 to decrease sufficiently that the resulting decrease in emitter current causes a decrease in the collector current of an amount sufficient to cause the grid 26 to become more negative and initiate a further decrease in current through the tube 19. This regenerative action continues until the tube 19 is cut off and minimum current conditions exist. Thus, each trigger circuit may be switched from its first to its second stable state by an input impulse applied to terminal 28 and may be switched from its second to its first stable state by an input impulse applied to terminal 35.

In considering the operation of the entire chain of Fig. 1, it is to be noted that in the first stable state of a trigger circuit, wherein the tube 19 is non-conductive, the cathode 24 of the tube is substantially at ground level. When the trigger circuit is switched from its first to its second stable state, the cathode 24 of tube 19 rises quickly to a more positive voltage level. On the other hand, when the trigger circuit is switched from its second to its first stable state the voltage level of the cathode again drops substantially to the level of the ground. Thus, a negative, or falling front, voltage impulse appears at the cathode of tube 19 each time the trigger circuit is switched from its second to its first stable state. Since the cathode of the tube 19 is connected to the terminal 28 of the next succeeding trigger circuit in the chain, this negative impulse at the cathode is effective, if the succeeding trigger circuit is in the first stable state, to switch it to the second stable state.

It is also to be noted that a negative or a falling front voltage impulse on the input line 36, being fed to terminals 35 of all of the trigger circuits in the chain, is effective to switch any trigger circuit which is in its second stable state to its first stable state.

Let it be assumed that initially trigger circuit 10 of Fig. 1 is in its second stable state while trigger circuits 11 and 12 are in their first stable states. Such a situation may be obtained in various well-known ways as by applying reset pulses or by the sequence of connecting the circuit together. An input impulse appearing on input line 36 then causes trigger circuit 10 to be switched from its second to its first stable state which causes the voltage at the cathode 24 of tube 19 to drop. This drop in voltage at the cathode of tube 19 is fed through the terminal 28 to the base $b$ of the translating device 18 in the next succeeding trigger circuit 11 causing that circuit to be switched from its first to its second stable state. The next input impulse on line 36 then switches trigger circuit 11 from its second to its first stable state and the cathode voltage of tube 19 is fed to the base $b$ of the translating device 18 in trigger circuit 12 to switch the latter from its first to its second stable state. Similarly, the third impulse on line 36 switches trigger circuit 12 to its first stable state causing trigger circuit 10 to be switched back to its second stable state.

As previously indicated, I have discovered that this arrangement for interconnecting the trigger circuits in a chain avoids the mismatch previously obtained and affords the desired chain operation. The output at resistor 25 in a trigger circuit is of proper phase to operate the next trigger circuit and the resistor does not interfere with operation of the trigger circuit in which it is included.

Figure 2:
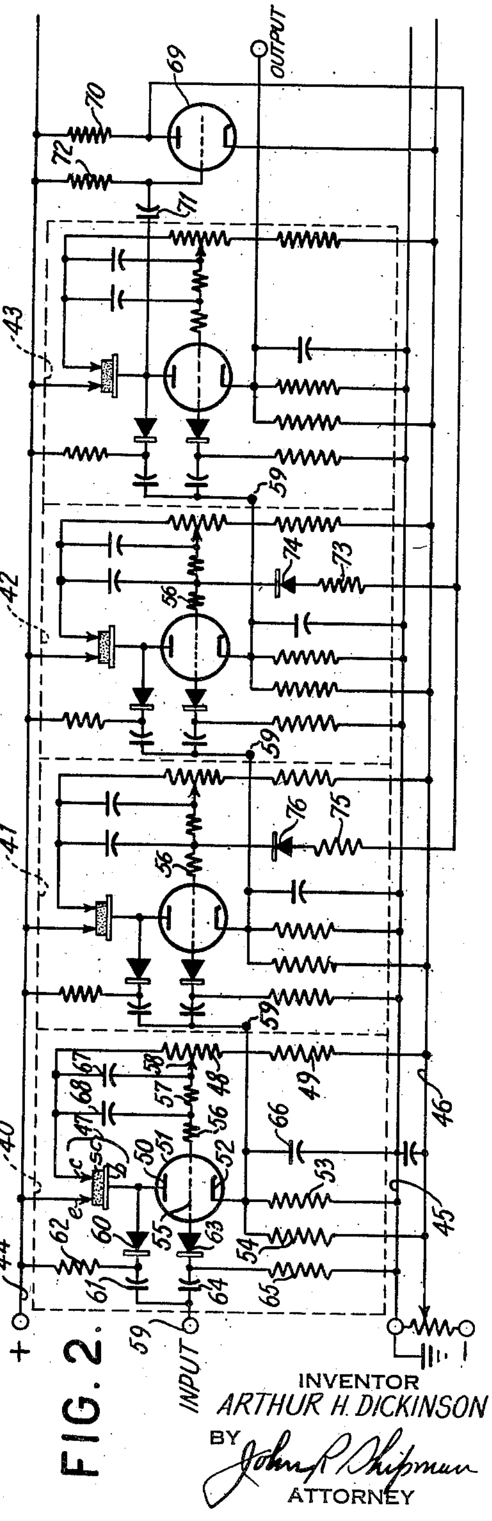
Fig. 2 is a circuit diagram of a chain of scaling trigger circuits in accordance with my invention in which a trigger circuit is operated from the output of the preceding trigger circuit.

While Fig. 1 shows a plurality of non-scaling trigger circuits connected in a chain, Fig. 2 shows a plurality of scaling trigger circuits connected in a chain. In Fig. 2 a plurality of scaling trigger circuits 40, 41, 42 and 43 are connected in a chain to form a decade counter. The four identical trigger circuits are identical and correspond to a scaling trigger circuit described in my aforesaid copending application. The chain is connected to three voltage supply lines comprising a positive supply line 44, a grounded line 45 and a negative voltage supply line 46.

Each of the trigger circuits 40, 41, 42, 43 includes a semiconductor translating device 47 comprising a semi-conductor *sc*, such as *n*-type germanium, having on its surface two suitably arranged point-contact, rectifying, electrodes forming an emitter *e* and a collector *c* and a large area ohmic contact electrode forming the base *b*. The emitter *e* of translating device 47 is connected to the positive supply line 44. The collector *c* is connected through series load resistors 48 and 49 to the negative supply line 46. The base *b* is connected to the anode 50 of a vacuum tube 51, the cathode 52 of which is connected through a resistor 53 to the grounded line 45 and through a resistor 54 to the negative line 46. The control grid 55 of tube 51 is connected through series resistors 56 and 57 to intermediate tap 58 on resistor 48 in the collector circuit. Resistors 56 and 57 serve to limit the grid current and to suppress any possible parasitic oscillations.

The base *b* of the semiconductor translating device 47 is also connected to an input terminal 59 through a diode rectifier 60 and a suitable differentiating circuit comprising a capacitor 61 and a resistor 62. The grid 55 of the tube 51 is also connected to the input terminal 59 through a diode rectifier 63 and another differentiating circuit comprising capacitor 64 and resistor 65. Thus, an input impulse appears concurrently at the base *b* and the grid 55.

The triggering operation of trigger circuits 40 through 43 in Fig. 2 are similar to those of the trigger circuits 10, 11 and 12 in Fig. 1. Thus, each of the trigger circuits 40 through 43 has two stable states, in the first of which minimum current flows through the emitter *e*, the tube 51 and the collector *c* while in the second a maximum current flows. Also, the connection of the control grid 55 to the intermediate tap 58 on the resistor 48 enables a feed-back producing the regenerative effect previously discussed.

The trigger circuits 40 through 43 of Fig. 2 differ from trigger circuits 10 through 12 of Fig. 1 in that they are arranged to be switched alternately between the first and second stable states by a series of input impulses applied concurrently to the base *b* and the grid 55 through the input terminal 59. As pointed out in my copending application a negative impulse appearing simultaneously at the base *b* and the grid 55 tends to produce two opposite effects. If the trigger circuit is in its first stable state in which minimum current conditions exist, a negative impulse at the grid 55 of tube 51 has no effect on the already non-conductive tube except that it tends to maintain the tube non-conductive. However, the same negative impulse at the base *b* causes an increase in the emitter and collector currents which tends to make the grid 55 less negative to cause the tube 19 to become conductive. On the other hand, if the trigger circuit is in its second stable state, in which maximum current conditions exist, a negative impulse on the grid 55 causes the tube 51 to become less conductive tending to decrease the emitter current. At the same time the negative impulse at the base *b* tends to increase the emitter current.

To permit a scaling operation of the trigger circuit in response to an input impulse appearing concurrently as indicated, each trigger circuit incorporates a condenser 66 connected between the cathode 52 of tube 51 and the grounded line 45 and a pair of condensers 67 and 68 connected between the collector *c* and the intermediate tap 58 on resistor 48 and the junction point between resistors 56 and 57, respectively. It is to be noted that condensers 67 and 68 may be replaced by single condenser connected between the collector *c* and intermediate tap 58, and either condenser 66 or condensers 67 and 68 may be omitted if desired.

As explained in my aforesaid copending application, a scaling operation of the trigger circuit is permitted by the action of either the condenser 66 or the condensers 67 and 68 or all of them. The condenser 66 is effective to delay changes in the voltage level of the cathode 52 of tube 51 after the tube is changed from a non-conductive to a conductive condition or vice-versa and thereby causes a greater initial rate of change in conductivity of the tube. The condensers 67 and 68 are effective to delay changes in voltage across that portion of the resistor 48 between the intermediate tap 58 and the collector *c* and thereby increases the initial rate of change in voltage across the remaining portion of resistor 48 and resistor 49 to cause a greater initial rate of change in tube conductivity.

With this arrangement each of the trigger circuits 40 through 43 is switched from either stable state to the other upon appearance of a suitable input impulse at the input terminal 59. The input terminal 59 of trigger circuit 40 is adapted to receive suitable input impulses from a supply source not shown. The input terminal 59 of each of the trigger circuits 41, 42, 43 is connected to the cathode 52 of tube 51 in the preceding trigger circuits 40, 41 and 42, respectively.

As previously mentioned, I have discovered that the interconnection between the trigger circuits as described in Fig. 2 provides suitable impedance matching between trigger circuits and permits the operation of these circuits in a chain. Thus, each time one of the trigger circuits 40 through 43 is switched from its second stable state to its first stable state, it supplies an input impulse to the next succeeding trigger circuit to switch it. With only the arrangement thus far described in Fig. 2, it is apparent to those skilled in the art that a binary counter would be provided. However, for certain practical applications this chain has been converted into a decade counter in a manner similar to the conversion of the Eccles-Jordan type trigger circuit chain, in my copending application Serial No. 71,796 filed January 21, 1949, now Patent 2,577,075 issued December 4, 1951. To provide this conversion an auxiliary triode 69 has its anode connected through a resistor 70 to the positive line 44 and its cathode connected to the negative line 46. The control grid of the triode 69 is coupled through condenser 71 to the anode 50 of tube 51 in trigger circuit 43 and is also connected through resistor 72 to the positive line 44.

It is then apparent that tube 69 is normally conductive. However, when trigger circuit 43 receives a negative impulse from trigger circuit 42, that impulse is also applied to the grid of triode 69, producing a positive voltage pulse at the anode of that tube. The anode of the triode 69 is connected to the grid 55 of tube 51 in trigger circuit 42 through resistor 73 and a diode rectifier 74 and resistor 56. The anode of triode 69 is also connected to the grid 55 of tube 51 in trigger circuit 41 through a resistor 75, a diode rectifier 76 and resistor 56. Consequently, each time a negative impulse is applied to the input of trigger circuit 43, the triode 69 feeds a positive voltage impulse to the grids of tube 55 in both trigger circuits 41 and 42. These positive impulses are effective to re-align the status of trigger circuits 41 and 42 so that the pattern of operation of the chain of trigger circuits is as shown in the following table of the state of all of the trigger circuits following each input impulse assuming all of the trigger circuits are initially placed in their first state in any well known manner.

| Input impulses | Trigger circuits | | | |
|---|---|---|---|---|
| | 40 | 41 | 42 | 43 |
| 0 | 1st | 1st | 1st | 1st |
| 1 | 2nd | 1st | 1st | 1st |
| 2 | 1st | 2nd | 1st | 1st |
| 3 | 2nd | 2nd | 1st | 1st |
| 4 | 1st | 1st | 2nd | 1st |
| 5 | 2nd | 1st | 2nd | 1st |
| 6 | 1st | 2nd | 2nd | 1st |
| 7 | 2nd | 2nd | 2nd | 1st |
| 8 | 1st | 1st | 1st | 2nd |
| re-align | ----- | 2nd | 2nd | ----- |
| 9 | 2nd | 2nd | 2nd | 2nd |
| 10 | 1st | 1st | 1st | 1st |

1st=first state.
2nd=second state.

It is then apparent that the circuit of Fig. 2 may be operated as a decade counter.

While the translating device specifically illustrated and dscribed herein has been of the type comprising a semiconductor with a large area ohmic base connection and point-contact, rectifying, emitter and collector connections, it is to be understood that my invention is not restricted to the use of this specific type of translating device. The important characteristic of the translating device in the trigger circuits connected in the chain is that when the translating device is suitably connected to a voltage supply, the output current from the device varies in accordance with and in the same direction as variations in the input voltage applied to the device.

While there have been shown and described and pointed out the fundamental novel features of the invention as applied to a preferred embodiment, it will be unaerstood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. A trigger circuit chain comprising a voltage supply; a plurality of trigger circuits, each including a translating device, input and output circuits connecting said translating device to said supply, said translating device having characteristics to provide output current variable with variations in input voltage applied to said device, a variable impedance member and a resistor interposed in series in said input circuit, said impedance member having a control element coupled to the output circuit to vary the impedance of said member, and thereby the input voltage applied to said device, directly with variations in output current, whereby the trigger circuit has two alternate stable states with current through said member at a maximum in one state and a minimum in the other and is switchable between states by appropriate momentary variations in input voltage applied to said device, and an input terminal coupled to said input circuit adjacent said device; and means coupling a point on said resistor of each trigger circuit to the input terminal of the next succeeding trigger circuit in the chain to vary momentarily, with a switching of the first mentioned trigger circuit, the input voltage applied to the translating device of said succeeding trigger circuit.

2. A trigger circuit chain comprising a voltage supply; a plurality of trigger circuits, each including a translating device, input and output circuits connecting said translating device to said supply, said translating device having characteristics to provide output current variable with variations in input voltage applied to said device, said input circuit extending between points of two different voltage levels of said supply and having a variable impedance member and a resistor interposed in series in the order named between the translating device and the lower level point, said impedance member having a control element coupled to the output circuit to vary the impedance of said member, and thereby the input voltage applied to said device, directly with variations in output current, whereby the trigger circuit has two alternate stable states with current through said member at a maximum in one state and a minimum in the other and is switchable between states by appropriate momentary variations in input voltage applied to said device, and an input terminal coupled to said input circuit between said member and device; and means coupling a point on said resistor of each trigger circuit to the input terminal of the next succeeding trigger circuit in the chain to vary momentarily, with a switching of the first mentioned trigger circuit, the input voltage applied to the translating device of said succeeding trigger circuit.

3. A trigger circuit chain comprising a voltage supply; a plurality of trigger circuits, each including a translating device, input and output circuits connecting said translating device to said supply, said translating device having characteristics to provide output current variable with variations in input voltage applied to said device, said input circuit extending between points of two different voltage levels of said supply and including a vacuum tube, having an anode and cathode, and a resistor, connected to said cathode, interposed in the order named between said translating device and the lower level point, said tube also having a control grid coupled to said output circuit to vary the impedance of said tube, and thereby the input voltage applied to said device, directly with variations in output current, whereby the trigger circuit has two alternate stable states with current through said tube at a maximum in one state and a minimum in the other and is switchable between states by appropriate momentary variations in input voltage applied to said device, and an input terminal coupled to said input circuit between said tube and device; and means coupling a point on said resistor of each trigger circuit to the input terminal of the next succeeding trigger circuit in the chain to vary momentarily, with a switching of the first mentioned trigger circuit, the input voltage applied to the translating device of said succeeding trigger circuit.

4. A trigger circuit chain comprising a voltage supply; a plurality of trigger circuits, each including a translating device, input and output circuits connecting said translating device to said supply, said input circuit extending between points of two different voltage levels of said supply, said translating device including a semiconductor connected to said output circuit to provide a normally relatively high impedance to output circuit current and also including means connected through the input circuit to the higher voltage level point to introduce current carriers into said semi-conductor of a sign opposite to that of the carrier normally present therein to vary said impedance in accordance with input circuit current, said input circuit also having a variable impedance member and a resistor interposed in series in the order named between the semiconductor and the lower level point, said impedance member having a control element coupled to the output circuit to vary the impedance of said member, and thereby the input circuit current, directly with variations in output current, whereby the trigger circuit has two alternate stable states with current through said member at a maximum in one state and a minimum in the other and is switchable between states by appropriate momentary variations in input circuit current, and an input terminal coupled to said input circuit adjacent said device; and means coupling a point on said resistor of each trigger circuit to the input terminal of the next succeeding trigger circuit in the chain to vary momentarily, with a switching of the first mentioned trigger circuit, the input circuit current of said succeeding trigger circuit.

5. A trigger circuit chain comprising three direct current voltage supply lines, the second being less positive than the first and more positive than the third; a plurality of trigger circuits, each comprising a translating device including a semiconductor having an emitter, collector and base, first circuit means connecting the emitter to the first line, second circuit means including a first resistor connecting the collector to the third line; a variable impedance member and a second resistor connected in a series circuit in the order named between the base and the second line, said impedance member having a control element connected to said first resistor in a positive feedback arrangement to vary the impedance of said member and thereby the emitter current directly with variations in collector current, whereby the trigger circuit has two alternate stable states with current through said member at a maximum in one state and a minimum in the other and is switchable between states by appropriate momentary variations in input circuit current, and an input terminal coupled to said input circuit between said member and base; and means coupling a point on said second resistor of each trigger circuit to the input terminal of the next succeeding trigger circuit in the chain to vary momentarily, with a switching of the first mentioned trigger circuit, the input circuit current of said succeeding trigger circuit.

6. A trigger circuit chain comprising a voltage supply; a plurality of trigger circuits, each including a translating device, input and output circuits connecting said translating device to said supply, said input circuit extending between points of two different voltage levels of said supply, said translating device including a semiconductor connected to said output circuit to provide a normally relatively high impedance to output circuit current and also including means connected through the input circuit to the higher level point to introduce current carriers into said semiconductor of a sign opposite to that of the carrier normally present therein to vary said impedance in accordance with input circuit current, said input circuit including a vacuum tube, having an anode and cathode, and a resistor, connected to said cathode, interposed in the order named between said semiconductor and the lower level point, said tube also having a control grid coupled to said output circuit to vary the conductivity of said tube, and thereby the input circuit current, directly with variations in output current, whereby the trigger circuit has two alternate stable states with current through said tube at a maximum in one state and a minimum in the other and is switchable between states by appropriate momentary variations in input circuit current, and an input terminal coupled to said input circuit between said tube and semiconductor; and means coupling a point on said resistor of each trigger circuit to the input terminal of the next succeeding trigger circuit in the chain to vary momentarily, with a switching of the first mentioned trigger circuit, the input circuit current of said succeeding trigger circuit.

7. A trigger circuit chain comprising three direct current voltage supply lines, the second being less positive than the first and more positive than the third; a plurality of trigger circuits, each comprising a translating device including a semiconductor having an emitter, collector and base, first circuit means connecting the emitter to the first line, second circuit means including a first resistor connecting the collector to the third line; third circuit means connecting the base to the second line including a vacuum tube, having an anode and cathode, and a second resistor, connected to said cathode, interposed in the order named between said base and second line, said tube also having a control grid connected to said first resistor in a positive feedback arrangement to vary the impedance of said tube and thereby the emitter current directly with variations in collector current, whereby the trigger circuit has two alternate stable states with current through said tube at a maximum in one state and a minimum in the other and is switchable between states by appropriate momentary variations in input circuit current, and an input terminal coupled to said input circuit between said tube and base; and means coupling a point on said second resistor of each trigger circuit to the input terminal of the next succeeding trigger circuit in the chain to vary momentarily, with a switching of the first mentioned trigger circuit, the input circuit current of said succeeding trigger circuit.

8. A trigger circuit chain comprising a voltage supply; a plurality of trigger circuits, each including a translating device, input and output circuits connecting said translating device to said supply, said translating device having characteristics to provide output current variable with variations in input voltage applied to said device, said input circuit extending between points of two different voltage levels of said supply and including a vacuum tube, having an anode and cathode, and a resistor, connected to said cathode, interposed in the order named between said translating device and the lower level point, said tube also having a control grid connected through at least a portion of said output circuit to said supply to establish a control circuit for the tube extending from said grid to the cathode and providing a positive feedback arrangement to vary the impedance of said tube, and thereby the input voltage applied to said device, directly with variations in output current, a first input terminal coupled to said input circuit between said tube and device, and a second input terminal coupled to said grid, whereby the trigger circuit has two alternate stable states with current through said tube at a maximum in one state and a minimum in the other, said trigger circuit being switchable from said one state to the other by a momentary reduction in voltage level at said second terminal and from said other state to said one state by a momentary reduction in voltage level at said first terminal; first means coupling a point on said resistor of each trigger circuit to the first input terminal of the next succeeding trigger circuit to reduce the voltage level of the first terminal of the succeeding trigger circuit upon a switching of the first mentioned trigger circuit from said other state to said one state; and a common input line connected to the second terminal of all of the trigger circuits and adapted to receive negative voltage impulses to switch any of the trigger circuits from said one state to the other.

9. A trigger circuit chain comprising a voltage supply; a plurality of trigger circuits, each including a translating device, input and output circuits connecting said translating device to said supply, said translating device having characteristics to provide output current variable with variations in input voltage applied to said device, said input circuit extending between points of two different voltage levels of said supply and including a vacuum tube, having an anode and cathode, and a resistor, connected to said cathode, interposed in the order named between said translating device and the lower level point, said tube also having a control grid connected through at least a portion of said output circuit to said supply to establish a control circuit for the tube extending from said grid to the cathode and providing a positive feedback arrangement to vary the impedance of said tube, and thereby the input voltage applied to said device, directly with variations in output current, whereby the trigger circuit has two alternate stable states with current through said tube at a maximum in one state and a minimum in the other, an input terminal coupled to said input circuit between said tube and device and to said grid, the trigger circuit being switchable from either state to the other by a concurrent reduction in voltage level at said input terminal; and means coupling a point on said resistor of each trigger circuit to the input terminal of the next succeeding trigger circuit in the chain to reduce the voltage level at said succeeding input terminal with every switching of the first mentioned trigger circuit from said one state to the other.

10. A trigger circuit chain energizable from a voltage supply comprising; a plurality of trigger circuits, each including a translating device, input and output circuits connected thereto for connecting said translating device to the voltage supply, said translating device having characteristics to provide output current variable with variations in input voltage applied to said device, said input circuit including a variable impedance member and said member having a control element coupled to the output circuit to vary the impedance of said member, and thereby the input voltage applied to said device, directly with variations in output current, whereby the trigger circuit has two alternate stable states with current through said member at a maximum in one state and a minimum in the other and is switchable between states by appropriate momentary variations in input voltage applied to said device, an input terminal coupled to said input circuit adjacent said device, and means coupling a point on said impedance member of each trigger circuit to the input terminal of the next succeeding trigger circuit in the chain to vary momentarily, with a switching of the first mentioned trigger circuit, the input voltage applied to the translating device of said succeeding trigger circuit.

ARTHUR H. DICKINSON.

REFERENCES CITED

The following references are of record in the file of this patent:

UNITED STATES PATENTS

| Number | Name | Date |
|---|---|---|
| 2,531,076 | Moore | Nov. 21, 1950 |
| 2,533,001 | Eberhard | Dec. 5, 1950 |